United States Patent [19]

Mercuri et al.

[11] Patent Number: 5,451,064
[45] Date of Patent: Sep. 19, 1995

[54] EXHAUST SEAL RING

[75] Inventors: Robert A. Mercuri, Seven Hills; Thomas W. Weber, Cleveland, both of Ohio

[73] Assignee: Ucar Carbon Technology Corporation, Danbury, Conn.

[21] Appl. No.: 994,711

[22] Filed: Dec. 22, 1992

[51] Int. Cl.⁶ ............................................. F16J 15/12
[52] U.S. Cl. .............................. 277/235 R; 277/116; 277/196; 277/229
[58] Field of Search ........... 277/116, 196, 203, 207 A, 277/227, 229, 231, 232, 233, 234, 235 R, 235 A, 235 B

[56] References Cited

U.S. PATENT DOCUMENTS

| | | | |
|---|---|---|---|
| 3,404,061 | 4/1963 | Shane et al. | 161/125 |
| 4,423,544 | 1/1984 | Kashmerick et al. | 277/235 R |
| 4,516,782 | 5/1985 | Usher | 277/1 |
| 4,659,091 | 4/1987 | Baasner et al. | 277/235 R |
| 4,762,330 | 8/1988 | Lenne et al. | 277/235 R |
| 4,871,181 | 10/1989 | Usher et al. | 277/235 R |
| 4,955,218 | 9/1990 | Brandener | 277/235 R |

*Primary Examiner*—Daniel C. DePumpo
*Attorney, Agent, or Firm*—F. J. McCarthy

[57] ABSTRACT

Seal ring for engine exhaust systems in the form of a composite of flexible graphite and metal mesh with the metal mesh being positioned close to the bearing surface of the seal ring whereby audible emanations from the seal ring during use are avoided.

4 Claims, 6 Drawing Sheets

EXHAUST SEAL RING

FIELD OF INVENTION

The present invention relates to a composite of flexible graphite and metal mesh for use as a seal ring in engine exhaust systems and to a method of forming such seal ring.

BACKGROUND OF THE INVENTION

The term "flexible graphite" as used herein represents the exfoliated reaction product of rapidly heated graphite particles which have been treated with an agent that intercalates into the crystal-structure of the graphite to expand the particles at least 80 or more times in the direction perpendicular to the carbon layers in the crystal structure. Flexible graphite and the making thereof is described in U.S. Pat. No. 3,404,061 Shane et al. Flexible graphite may be compressed into thin sheets (hereinafter referred as "foil") with a density approaching theoretical density, although a density of about 50 to 85 lbs./ft.$^3$ is suitable for most applications, including compression into shapes suitable as seal rings in engine exhaust applications.

Flexible graphite foil is coherent, with good handling strength, and flexible graphite foil can be wound into rolls and can also be wrapped around metal fixtures such as mandrels, possesses heat insulating properties and is, accordingly, particularly useful for high temperature applications such as engine exhaust seal ring applications, particularly when formed in a composite with metal mesh.

Prior art flexible graphite-metal mesh composites have been found to be effective in seal ring applications but have been characterized by "squeaky" operation, i.e. the emanation of audible responses, which suggest that there is an imminent failure situation, although there is no known data to support a relationship between the audible emanations and failure and no such failures have been detected. Since the suspicion of failure remains, however, even though unsubstantiated, it is important to eliminate the audible emanations so that a flexible graphite-metal composite seal ring will become more acceptable to users.

Accordingly, it is an object of the present invention to provide a flexible graphite-metal composite seal ring for engine exhaust systems which does not generate audible responses during use. Other objects will be apparent from the following description and claims taken in conjunction with the drawing.

BACKGROUND OF THE INVENTION

SUMMARY OF THE INVENTION

The present invention relates to a seal ring for engine exhaust systems formed of a composite of flexible graphite and metal, preferably in the form of mesh, e.g. stainless steel mesh. The seal ring is circular in shape and hollow and has a spherically shaped outer surface and the portion of the seal ring immediately adjacent the outer surface has a metal to graphite ratio by volume of more than 1.0. That is, the embedded metal mesh is displaced toward, and is partially contiguous to the bearing surface of the seal ring whereby emanation of noise, i.e. squeaks, from the seal ring is virtually eliminated.

DETAILED DESCRIPTION

Figure 1:
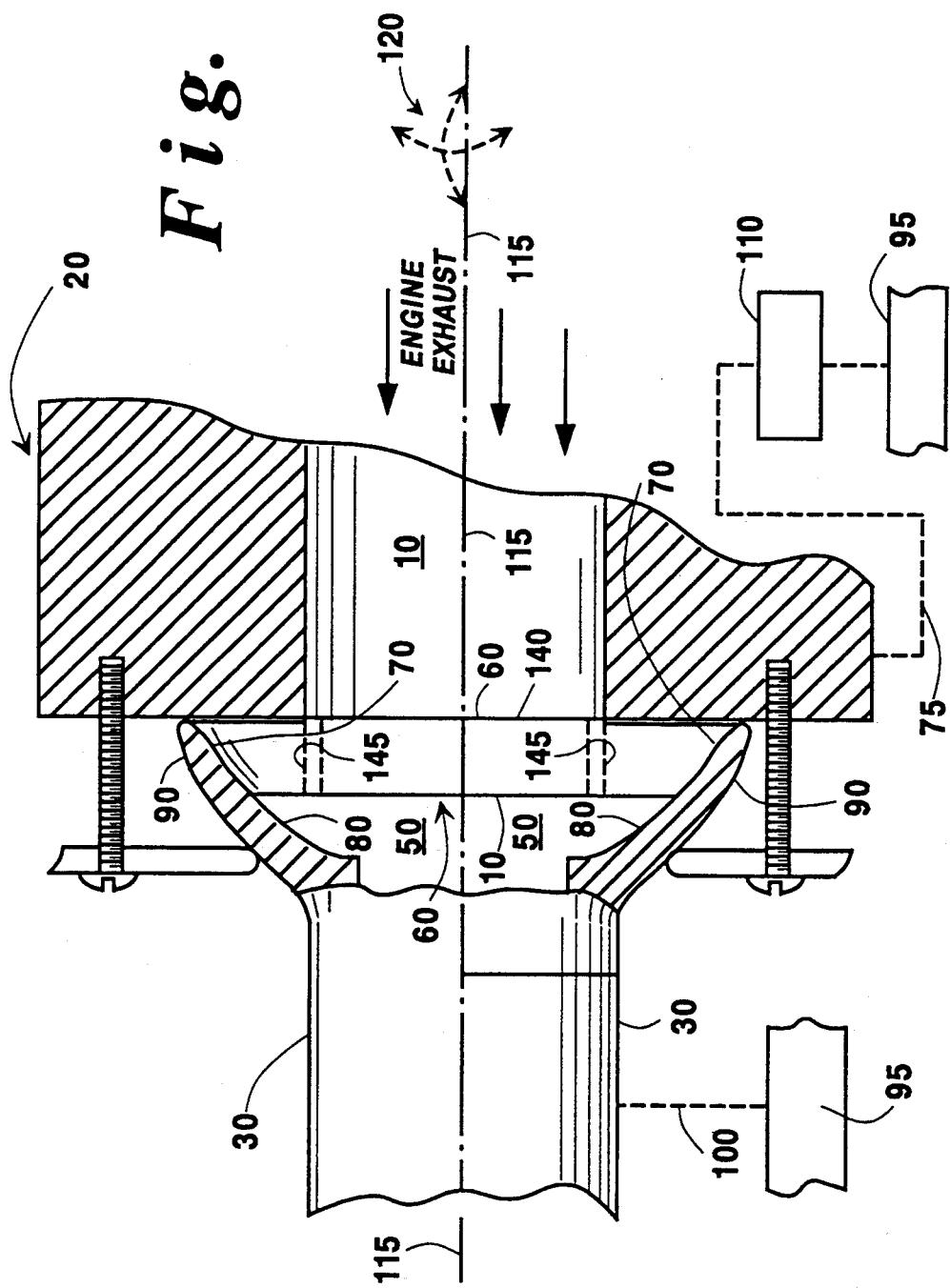
FIG. 1 shows, somewhat schematically, a conventional arrangement for an engine exhaust system which utilizes a ball and socket type of coupling between the exhaust manifold outlet and exhaust pipe.
Figure 2:
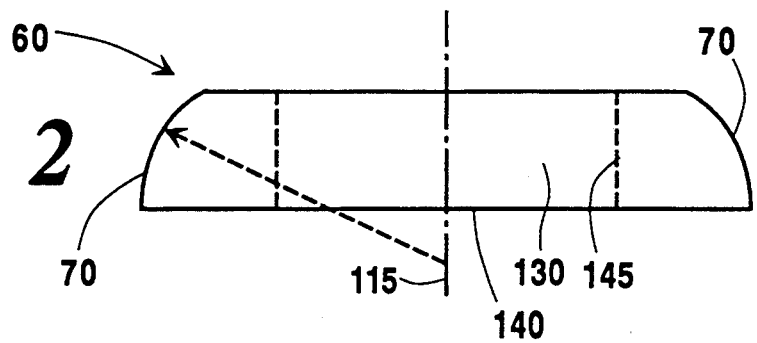
FIGS. 2, 2A, 2B, show, respectively, side, top and bottom views of the seal ring shown in side elevation in FIG. 1.
Figure 2A:
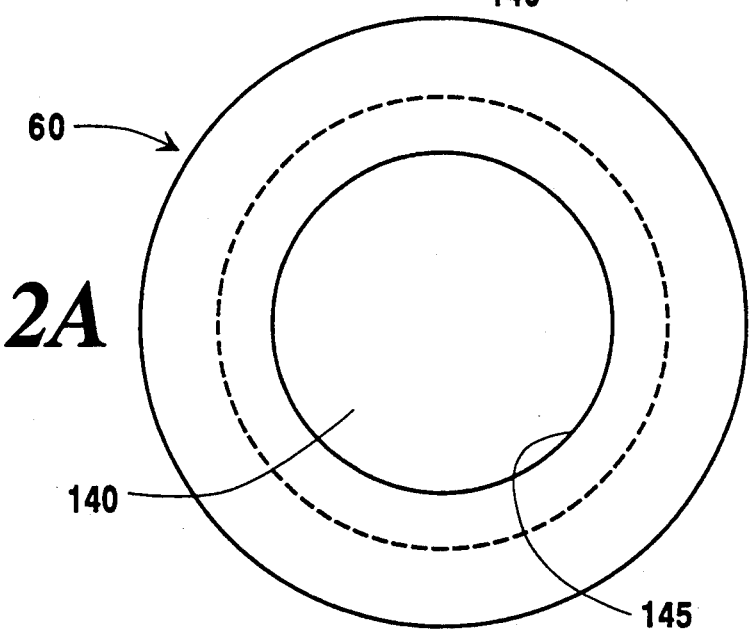
Figure 2B:
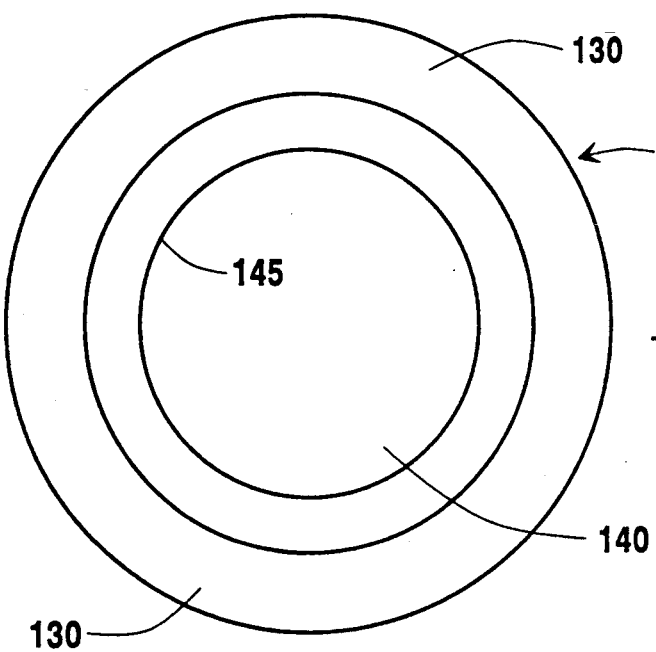
Figure 3:
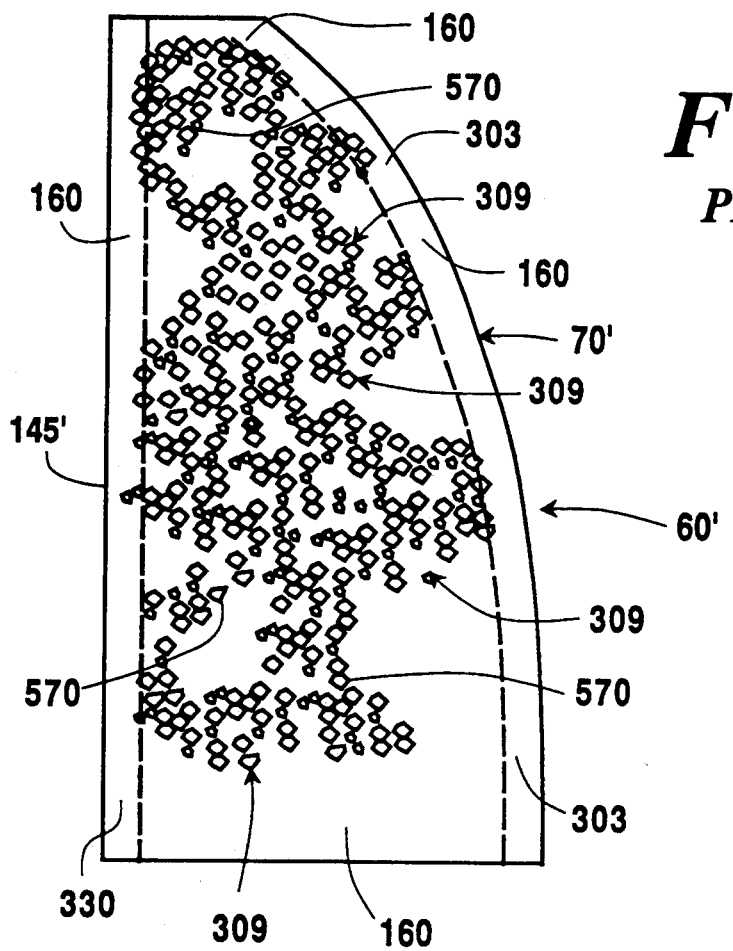
FIG. 3 shows a side elevation view, in section, of a seal ring of the prior art.

With reference to FIG. 1, it is a common practice in the operation of vehicular and stationary internal combustion engines to couple the outlet duct 10 of an engine exhaust manifold 20 to an exhaust pipe 30 by way of a "ball and socket" type of mechanical sealing joint indicated at 50 comprising a seal ring indicated at 60, which is provided with a spherical outer bearing surface 70 which bears against a corresponding spherical, metal (e.g. stainless steel) inner surface 80 of flanged extension 90 of metal exhaust pipe 30. A "ball and socket" type of mechanical sealing joint 50 is selected since the metal exhaust pipe 30 can be considered to be (relatively) stationary since it is mechanically fixed, as indicated schematically at 100, to the frame 95 of the vehicle or other device powered by an engine, while the engine exhaust manifold 20 is fixed to an engine which is resiliently coupled at 75 to frame 95 by well known engine mount mechanisms indicated schematically at 110. That is, since the exhaust manifold 20, and hence integral outlet exhaust duct 10 can be caused to move, e.g. by engine vibrations, with respect to longitudinal axis 115 in a virtually unlimited manner as represented at 120, as a practical matter, the coupling joint cannot be a fixed joint, if mechanical failure is to be avoided, and, since the escape of exhaust gases must be prevented, a conformal bearing joint is required which is provided by the seal ring configuration shown at 60 in FIGS. 1, 2, 2A, 2B. The seal ring 60 of FIGS. 1, 2, 2A, 2B is in the form of a spherical section with its outer peripheral surface 70 being a spherical portion, and is hollow, with a passage 140 bounded by inner surface 145, to receive and closely engage outlet duct 10 as herein above described. Prior art seal rings have been formed from flexible graphite compressed about a core of steel mesh to provide a seal ring 60' shown in section in FIG. 3 wherein the metal mesh 570, which enhances the strength of ring 60', is embedded as a core 309 in the compressed flexible graphite 160. The seal ring 60' of FIG. 3 provides good sealing and mechanical performance. However, the spherically shaped virtually totally graphite outer surface 70', of seal ring 60', after being in service for a short while would emanate low level audible reports, somewhat similar to a series of "squeaks", particularly noticeable when the engine was in the course of being "turned off". Audible reports i.e. "squeaks" could sometimes be heard, even when the engine was shut down, by rocking the engine on its mounts. Investigation has shown that such audible effects do not indicate any mechanical or sealing defect, but is inherent in a metal-graphite bearing contact where a small amount of graphite "smears" from the graphite-rich outer surface 70' of the adjacent peripheral region 303, (in which the graphite predominates, by volume, to a depth of 3 mm), onto a metal surface. In peripheral region 303, the ratio of graphite volume to metal volume is substantially greater than 1.0. Although the above-noted situation did not indicate the existence of any apparent operational defect, it is an annoying audible phenomenon which suggests a future operational problem and thus impedes the full acceptance of a flexible graphite based seal ring by giving the impression that something is not performing properly.

Figure 4A:
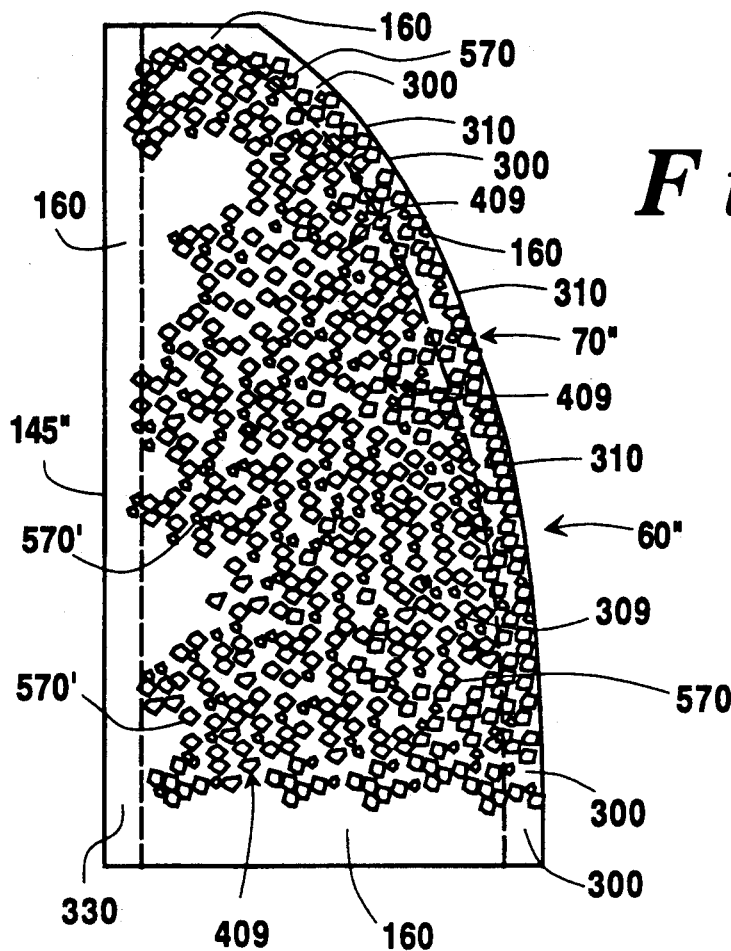
FIGS. 4A and 4B show a side elevation view and a partial side elevation view, in section, of a seal ring in accordance with the present invention.

In the present invention, it has been found that the above-mentioned audible effect can be virtually eliminated, while retaining the excellent sealing and mechanical properties of a graphite-metal mesh composite, when the metal mesh is displaced from its essentially central core position as indicated at 309 in the Prior Art configuration of FIG. 3, toward the spherically shaped outer peripheral surface of the seal ring, as indicated at 409 in FIG. 4A. With reference to FIG. 4A, seal ring 60", in accordance with the present invention, is formed of compressed flexible graphite 160 and embedded metal mesh 570' wherein at the peripheral portion 300 of the seal ring which is immediately adjacent the outer peripheral surface 70" of the seal ring, e.g. a layer about 3 mm in depth, the ratio of metal volume to graphite volume is greater than 1.0 and preferably greater than 1.5 and suitably up to 4.0, with at least some of the metal 570' actually abutting the outer surface 70" as indicated at 310, and being intermittently visible at outer surface 70" as indicated at 320. The metal concentration at the portion 330 of the seal ring 60" immediately adjacent the inner peripheral surface 145" thereof is substantially less than at the outer peripheral surface region 300, and the ratio of metal volume to graphite volume is less than 1.0, preferably less than 0.75, in the region 330, e.g. a peripheral layer having a depth of 3 mm. It is believed that the high concentration of metal at the outer peripheral surface 70" of seal ring 60", instead of graphite, substantially avoids the smearing of graphite onto an adjacent bearing surface, and metal which becomes exposed by wear of the seal ring 600, in use, essentially removes any incidental amount of smeared graphite on the adjacent bearing surface.

Figure 6:
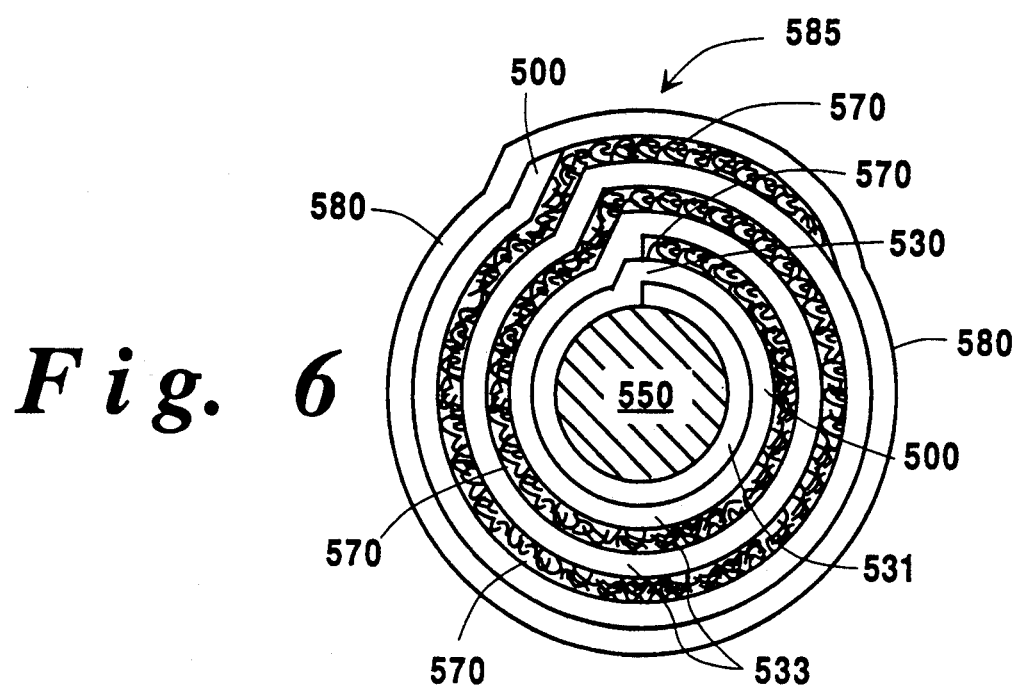
FIG. 6 shows an assembly of a mandrel with wrappings of flexible graphite foil and metal mesh in accordance with the present invention, with the thickness of the wrappings being relatively exaggerated, by enlargement, for purposes of illustration.
Figure 4B:
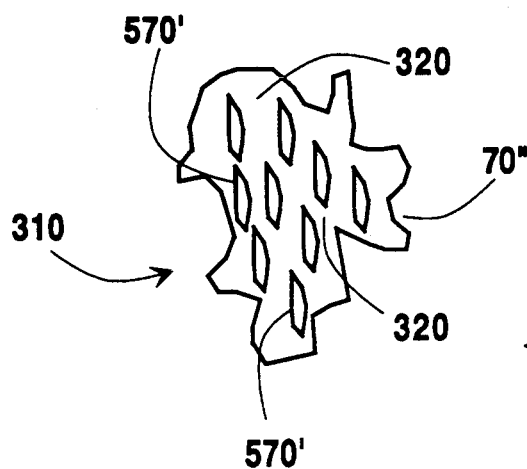
Figure 5A:
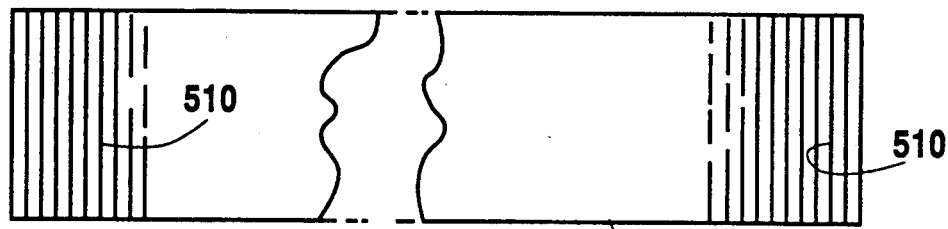
FIGS. 5A, 5B show, respectively, a plan view and side view of a flexible graphite crinkled foil strip.
Figure 5B:
Figures 5C, 5D:
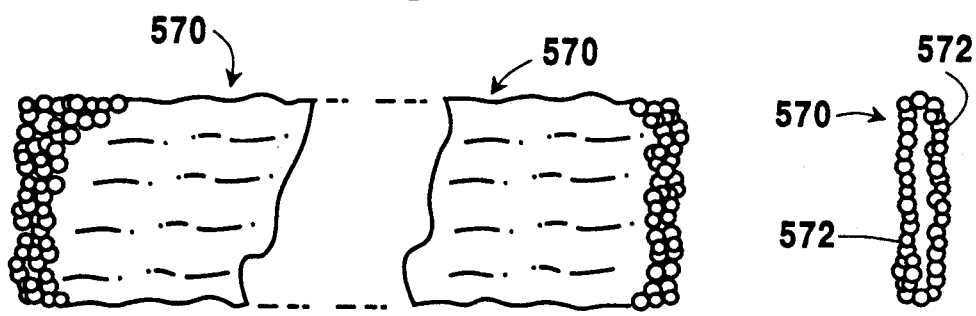
FIGS. 5C, 5D show, respectively, a plan view and side elevation view of a strip of metal mesh in the form of a flattened, knit, sleeve.
Figure 5E:
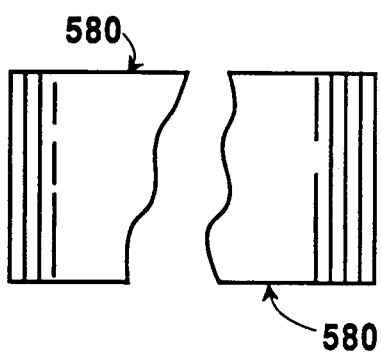
FIGS. 5E, 5F are representations similar to FIGS. 5A, 5B for a smaller length of flexible graphite foil.
Figure 5F:
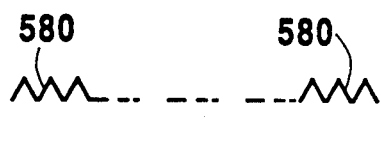
Figure 7:
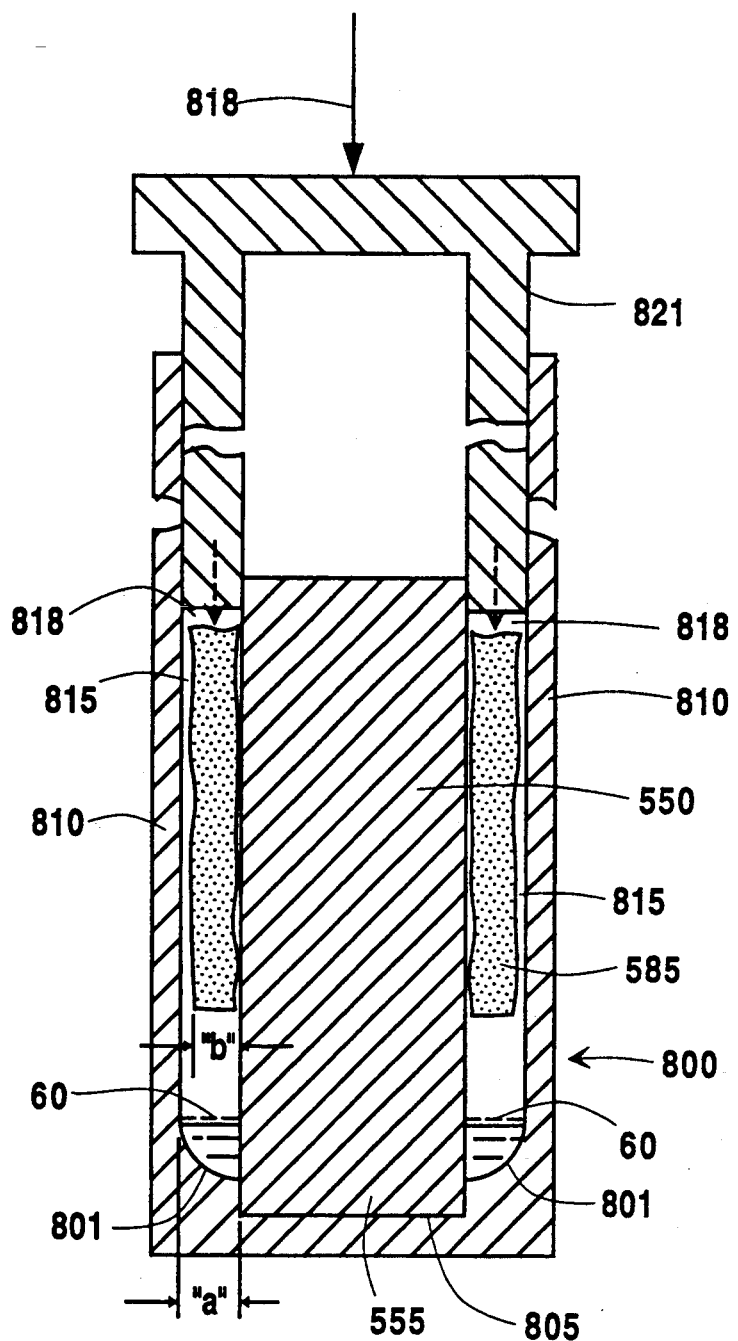
FIG. 7 shows an elevation view in section of a compression mold for the making of the seal ring of the present invention.

In the practice of the present invention, with reference to FIGS. 5A-5F, a strip of flexible graphite foil 500, suitably "crinkled" at 8%, i.e. reduced in length by 8% by corrugations 510, as shown in FIG. 5B, is wrapped around a die mandrel 550 shown in FIG. 7 to form at least two contiguous layers of flexible graphite foil indicated at 530, 531 in FIG. 6. After a plurality of flexible graphite contiguous layers have been formed, e.g. at least two, metal mesh strip 570, shown in FIG. 5C and in FIG. 5D as a flattened knit metal mesh sleeve surrounding opening 572, is interleaved with remaining flexible graphite foil strip 500, and winding of the contiguous flexible graphite foil strip and metal mesh strip is continued to provide a plurality of flexible graphite strips 533 separated by interleaved metal mesh strips 570 as shown in FIG. 6. When a desired amount of interleaved graphite and metal has been wrapped around die mandrel 550, i.e. sufficent to provide a predetermined seal ring size, the wrapping is terminated. An additional, short flexible graphite foil strip 580, having not more than one half the thickness of graphite foil 500, is wrapped around the wrapped graphite-metal assembly 585 on mandrel 550 to provide a single outer covering, or finishing layer for the assembly 585. Outer graphite layer 580 has a substantially lesser thickness, i.e. volume, than inner graphite layer 599, e.g. not more than 0.75 of the thickness of inner layer 599. With reference to FIG. 7, the cylindral die mandrel 550 and assembly 585 are placed in a mold 800, with the bottom portion 555 of mandrel 550 seated in a circular recess 805 of mold 800. A ring shaped bottom mold portion 801 surrounds the bottom, unwrapped portion of die mandrel 550. Assembly 585, which is slightly spaced as indicated at 815, from the adjacent mold sidewall 810 which forms a sleeve around the mandrel and assembly 585, is subjected to pressure by a downward compressive force 818 acting on hollow ram or plunger 821. The graphite-metal assembly 585 is compressed into the spherically surfaced ring shape indicated at 60 in FIG. 7 (and also in FIG. 2) in which the cross-section "a" of the ring 60 is greater than the cross-section "b" of the uncompressed graphite-metal assembly 585. This effect is due to the compressive shortening of assembly 585 under high pressure whereby material of assembly 585 is caused to spread out from mandrel 550 to fill the spherically surfaced ring shaped mold portion 801. In view of the increased volume of graphite (at least two full wraps) adjacent the mandrel 550 (see "500" in FIG. 6) and the greater width of cross-section "a", relative to "b", the interleaved metal mesh is displaced radially outward from die mandrel 550 by the flow of compressed flexible graphite. This results in the configuration of FIG. 4 of the present invention where metal mesh 570' in ring 60" is closely adjacent, and partly contiguous to the spherical bearing surface 70". In contrast, the ring 60" of FIG. 3, made from an assembly formed by wrapping completely coextensive adjacent layers of flexible graphite foil and interleaved mesh has the configuration of FIG. 3 in which the embedded metal mesh 570 is essentially centered in the graphite and spaced away from the spherical surface 70'.

EXAMPLE

Flexible graphite foil, GRAFOIL*, 32.6 in.×0.010 in.×2.12 in., crinkled at @ 8% (reduced in overall length to 30 in. length) was wrapped around a steel die mandrel (2 in. O.D.) twice. After the two full wraps of flexible graphite, wire mesh 23 in.×2.0 wide of double strand 30 gauge wire knot (American Wire Gauge Std.) was interleaved with the remaining graphite foil and the wrap completed so that two more full wraps of graphite foil and two contiguous interleaved layers of metal foil were wrapped around the inner graphite layers. The assembly was covered with one wrap of thin graphite foil 0.05 inch thick and loaded into a mold of the type shown in FIG. 7. A force of 25 ton was applied to form a ring of the shape shown in FIG. 2 which had a metal-graphite distribution of the type shown in FIG. 4. The following percentages by weight of raw materials were used to form the exhaust seal ring:

Stainless Steel Wire Mesh Sleeve: 76%
Flexible Graphite Foil: 24%

* Registered Trademark of UCAR Carbon Technology Corporation

The ratio, by volume, of graphite to metal in the peripheral region 3 mm deep ("300" in FIG. 4) was more than 1.25 based on measurements of a photograph of a cross-section of the seal ring.

Seal rings made in the foregoing manner have not produced audible emanations of "squeaks" during tests on internal combustion engines.

In the present invention, the metal mesh is preferably made from stainless steel wire 0.008 to 0.012 in. diameter with mesh openings from about 0.005 to 0.015 in. The mesh is suitably in the form of a flattened double knit sleeve of stainless steel wire.

The graphite of the seal ring is suitably 20% to 40% by weight (50% to 75% by volume) and the metal content is suitably 60% to 80% by weight (50% to 25% by volume). While stainless steel mesh is preferred because of its oxidation resistance other metals may be used for example copper alloys, and nickel alloys.

What is claimed is:

1. Seal ring in the form of a hollow spherical section formed by the compression of respective interleaved layers of flexible graphite and metal mesh, said seal ring having an outer partially spherical surface for a sealable mechanical joint engagement with a socket-type shaped exhaust pipe inlet, and having a radially inner surface for closely surrounding the exhaust outlet of an engine, the peripheral portion of the seal ring immediately adjacent the radially outer surface of the seal ring to a depth of 3 mm having a metal volume to graphite volume ratio of greater than 1.0 and the peripheral portion of the seal ring ring to a depth of 3 mm having a metal volume to graphite volume ratio of less than 1.0.

2. Seal ring in accordance with claim 1 wherein the metal mesh constitutes between 60 and 80 percent by weight of the seal ring.

3. Seal ring according to claim 1 wherein the portion of the seal ring immediately adjacent the outer surface of the seal ring to a depth of 3 mm has a metal volume to graphite volume ratio of greater than 1.5.

4. Seal ring according to claim 1 wherein some of the metal immediately adjacent the radially outer surface of the seal ring actually abuts the radially outer surface and is intermittently visible at said radially outer surface.

* * * * *